United States Patent [19]

Tsutsui et al.

[11] Patent Number: 4,755,651
[45] Date of Patent: Jul. 5, 1988

[54] LIQUID LEVEL SETTING MEANS FOR ELECTRIC DISCHARGE MACHINE

[75] Inventors: Kikuo Tsutsui, Isehara; Takeshi Chikamoto, Atsugi, both of Japan

[73] Assignee: Amada Company, Limited, Japan

[21] Appl. No.: 821,963

[22] Filed: Jan. 24, 1986

[30] Foreign Application Priority Data

Jan. 24, 1985 [JP] Japan .................................. 60-9865

[51] Int. Cl.⁴ ............................ B23H 1/10; B23H 7/36
[52] U.S. Cl. ................................. 219/69 D; 219/69 R
[58] Field of Search ............... 137/390, 395, 396, 573, 137/576, 577; 219/69 M, 69 R, 69 D; 74/44, 105, 545

[56] References Cited

U.S. PATENT DOCUMENTS

| | | | |
|---|---|---|---|
| 2,548,696 | 4/1951 | Barstow et al. | 219/69 R |
| 3,524,457 | 8/1970 | Laimböck | 137/577 |
| 4,257,437 | 3/1981 | Pearson | 137/396 |
| 4,345,618 | 8/1982 | Altman et al. | 137/396 |
| 4,622,449 | 11/1986 | Inoue | 219/69 R |
| 4,628,170 | 12/1986 | Furukawa | 219/69 M |

FOREIGN PATENT DOCUMENTS

| | | | |
|---|---|---|---|
| 2514899 | 10/1976 | Fed. Rep. of Germany | 219/69 D |
| 3303758 | 8/1984 | Fed. Rep. of Germany | 219/69 D |
| 152018 | 8/1984 | Japan . | |
| 169727 | 9/1984 | Japan | 219/69 D |
| 993202 | 5/1965 | United Kingdom | 219/69 D |
| 396226 | 1/1974 | U.S.S.R. | 219/69 D |

OTHER PUBLICATIONS

"DP 275A, EDM Machine", by Japax, published Aug. 1973.

Primary Examiner—A. D. Pellinen
Assistant Examiner—Geoffrey S. Evans
Attorney, Agent, or Firm—Wigman & Cohen

[57] ABSTRACT

The level of the working fluid in the work tank of an electrical discharge machining is controlled by a device located externally of the work tank. A vertically arranged cylindrical liquid level setting device is supported on the machine frame outside the work tank and is connected to the work tank by a tube. The liquid level setting device is vertically adjustable with respect to the frame by a manually operated shaft and link mechanism. In a second embodiment, an upper tank containing a supply of working fluid communicates with the work tank through a valve which is actuated by a float and limit switch to control the level of working fluid in the work tank.

3 Claims, 2 Drawing Sheets

LIQUID LEVEL SETTING MEANS FOR ELECTRIC DISCHARGE MACHINE

BACKGROUND OF THE INVENTION

1. Field of the Invention

This invention relates to an electrical discharge machining machine. More specifically, it relates to a die milling electrical discharge machining machine in which the shape of the electrode is transferred to the work piece.

2. Description of the Prior Art

As is well-known, a die milling electrical discharge machining machine has a work table for the purpose of fixing the work pieces in plate, and also a work tank which surrounds the work table. In addition, a die milling electrical discharge machining machine has an electrode to perform electrical discharge machining and an electrode holder which is free to move along the X, Y and Z axes for adjustment.

In an electrical discharge machining machine with a configuration such as that described above, after the work piece is fixed in place on the work table the work tank is filled with enough working or dielectric fluid so that the work piece can be submerged in it. After that, the electrode is brought into contact with the top surface of the work piece, then the work piece is machined by moving the electrode in very small steps while an electrical discharge is produced between the electrode and the work piece.

In an electrical discharge machining machine as described above, kerosene is generally used as a working or dielectric fluid which satisfies the following conditions: (1) the molten metal filings produced by the electrical discharge machining are cooled and dispersed; (2) the dispersed filings are removed from the space between the work piece and the electrode; (3) parts which are heated by the electrical discharge machining are cooled; (4) the electrical insulation between the work piece and the electrode is restored. Sparks produced by the electrical discharge occur inside the dielectric fluid, and since there is no oxygen there is no danger of fire. However, if an electrical discharge should occur at the surface of the working or dielectric fluid because of an oversized work piece or a drop in the working or dielectric fluid level, there is a danger that the working or dielectric fluid will be ignited.

Therefore, in a die milling electrical discharge machining machine, the working or dielectric fluid level can be adjusted to correspond to the size of the work piece. In previous electrical discharge machining machines there was a level setting plate inside the work tank; the height of the plate could be adjusted directly to set the liquid level. This meant that the operator had to come into contact with the working or dielectric fluid and as a result the operator become soiled. In addition it was difficult to set the liquid level accurately.

SUMMARY OF THE INVENTION

The first purpose of this invention is to provide an electrical discharge machining machine in which the working or dielectric fluid level of the dielectric fluid inside the work tank of the electrical discharge machining machine can be set easily without contacting the working or dielectric fluid.

The second purpose of this invention is to provide an electrical discharge machining machine in which the fluid level of the dielectric fluid inside the work tank can be easily set from outside.

The third purpose of this invention is to provide an electrical discharge machining machine in which the fluid level of the dielectric fluid inside the work tank can be set accurately.

The fourth purpose of this invention is to provide an electrical discharge machining machine in which a drop of the fluid level of the dielectric fluid inside the work tank can be easily detected.

In order to achieve the above purposes, in this invention a fluid level setting means which passes through the work tank of the electrical discharge machine is installed in the frame of the electrical discharge machine so that it is free to move up and down, and an external control device which controls the up-down movement of the liquid level setting means is installed on the outside of the frame. In addition, there is a liquid level detection switch at the top of the liquid level setting means to detect drops in the liquid level.

DESCRIPTION OF THE PREFERRED EMBODIMENT

Figure 2:
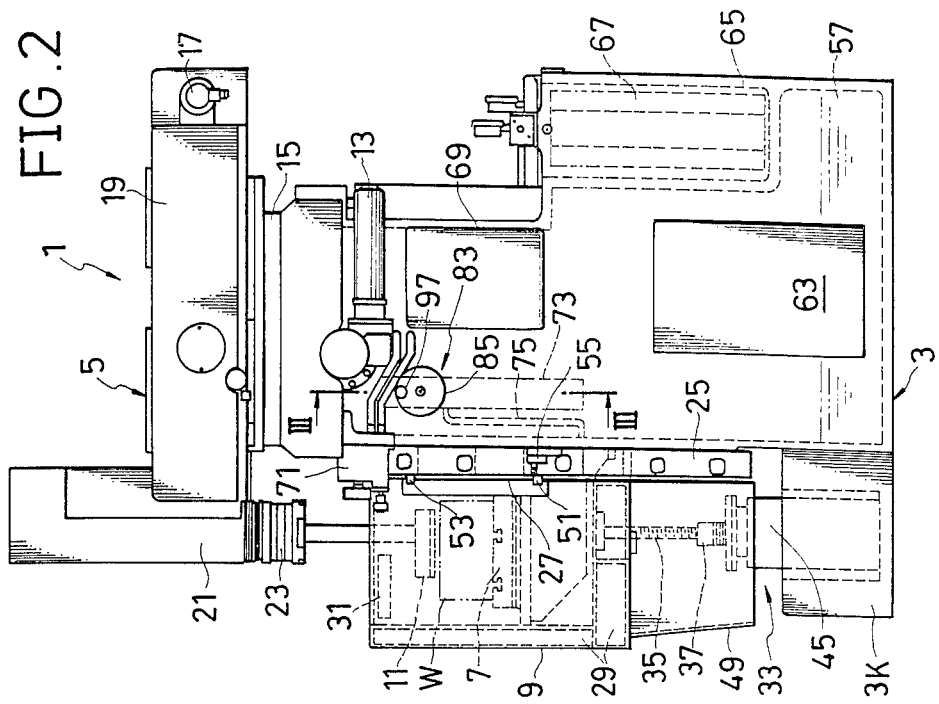
FIG. 2 is a right side elevational view of the same electrical discharge machining machine.
Figure 1:
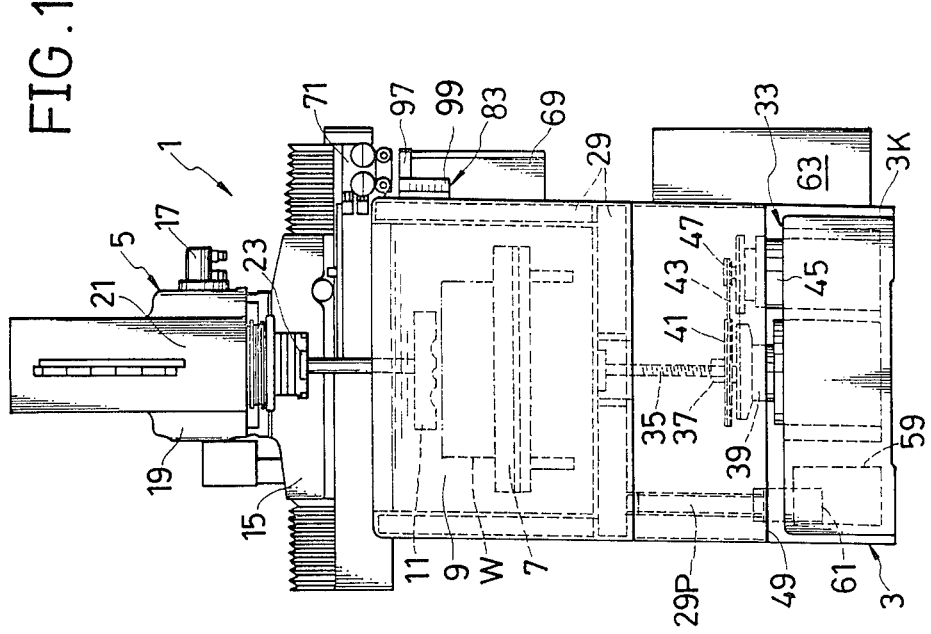
FIG. 1 is a front elevational view of an electrical discharge machining machine to which this invention relates.

Referring to FIG. 1 and 2, the electrical discharge machining machine 1, in broad outline, has a box-shaped base frame 3 on top of which is a machining head assembly 5. In addition, there are a work table 7 and a work tank 9 on the front surface of the base frame 3.

The machining head assembly 5 supports an appropriately shaped electrode 11 for the purpose of electrical discharge machining of the work piece W which is fixed to the work table 7. The configuration is such that the electrode 11 can be freely moved along the X, Y and Z axes to adjust its position. That is to say, although a detailed diagram is not given here, an X-axis slider 15 which is free to move back and forth in the X-direction (the left-right direction in FIG. 1) is driven by an X-axis drive motor 13 such as a servomotor which is mounted on the base frame 3. A Y-axis slider 19 which is free to move in the Y direction (the left-right direction in FIG. 2), driven by a suitably mounted Y-axis drive motor 17, is mounted on the top surface of this X-axis slider 15. The machining head 21 is mounted opposite the work table 7 on the front tip of this Y-axis slider 19. The electrode holder 23 which supports the electrode 11 is supported by this machining head 21 so that it is free to move up and down for adjustment. The electrode holder 23 is finely adjusted in the up-down direction by being driven by a Z-axis drive motor (not shown in the figure) which is mounted inside the machining head 21.

As can be understood from the configuration described above, the electrode 11 is moved in the X and Y directions by the X-axis drive motor 13 and the Y-axis drive motor 17, and can be moved up and down by the Z-axis drive motor.

The work table 7 to which the work piece W is fixed is fixed to the front surface of the base frame 3, for example by bolts. The work tank 9, which can contain this work table 7, is installed on the front surface of this base frame 3 so that it is free to move up and down.

In more detail, the work tank 9 is surrounded by the front, left, right and bottom sides of the work table 7. In other words, the work tank 9 has the shape of an open box formed by its top side and its rear side which is opposite to the base frame 3, and can move up and down along the guide member 25 which is mounted vertically on the front surface of the base frame 3. Between the work tank 9 and the guide member 25 is a seal member 27 which prevents the working or dielectric fluid in the work tank 9 from flowing out. The front, left and right walls and the bottom of the work tank 9 are of double construction, with both inner and outer walls. Between the inner and outer walls are mutually interconnecting drain paths 29. The overflow openings 31 are formed at the tops of the front and side inner walls of the work tank 9. In addition, at a suitable position in the bottom of the work tank 9 is a drain pipe 29P communicated with the drain path 29.

A raising and lowering device 33 is provided at the bottom of the work tank 9 to move the work tank 9 up and down. In more detail, the threaded bolt or lever 35 is installed vertically in the bottom surface of the work tank 9, and the nut member 37 is screwed onto this threaded bolt or lever 35. The nut member 37 is supported by the cylindrical bearing member 39 which is installed in the knee section 3K of the base frame 3 so that it can only rotate. The pulley 41 is solidly coupled to the nut member 37. The belt 43 is wrapped around this pulley 41 and also around the drive pulley 47 which is attached to the up-down drive motor 45. The up-down drive motor 45 is mounted on the knee section 3K. The threaded bolt 35, up-down drive motor 45 and associated parts are surrounded by the cover plate 49 which is attached to the bottom of the work tank 9.

In order to set the upper limit and lower limit of the work tank 9, there is a limit switch 55 on the base frame 3, and the upper limit dog 51 and the lower limit dog 53 are installed in the work tank 9. The limit switch 55 is operated by the dogs 51 and 53. When this limit switch 55 is operated by the dogs 51 and 53, it acts to stop the driving action of the up-down drive motor 45.

As can be understood from the configuration explained above, the work tank 9 can be moved up or down by an appropriate amount by suitable driving action of the up-down drive motor 45, which rotates the nut member 37 in the forward or reverse direction. When the work tank 9 reaches its upper or lower limit, so that dog 51 or 53 operates the limit switch 55, the driving action of the up-down drive motor 45 is stopped; thus the upper limit or lower limit of the work tank 9 is set. Consequently, when electrical discharge machining of the work piece W is performed, by setting the work tank 9 at its upper limit, it is possible to fill the work tank 9 with enough working or dielectric fluid so that the work piece W can be submerged. Also, when the work piece W is attached to or removed from the work table 7, by setting the work tank 9 at its lower limit, the work piece W can be easily attached or removed without the work tank 9 getting in the way, and without having to empty the working or dielectric fluid out the work tank 9.

A storage tank 57 is formed inside the base frame 3 to store the working or dielectric fluid to be supplied to the work tank 9. In more detail, the base frame 3 comprises a suitable hollow box-shaped enclosure with the knee section 3K formed at its bottom to form a storage tank 57 inside the base frame 3. A connecting chamber 59 which communicates with the storage tank 57 is formed in the knee section 3K. A pipe 61 into which the drain pipe 29P can be inserted is installed in this connecting chamber 59. Consequently, working or dielectric fluid which overflows from the opening 31 of the work tank 9 is stored in the storage tank 57.

Although a detailed diagram is omitted, in order to supply the working or dielectric fluid in the storage tank 57 to the work tank 9, a pump unit 63 is mounted on the base frame 3. This pump unit 63 contains a fluid pressure pump and also a heat exchanger to cool the working or dielectric fluid.

A filter chamber 65 which is connected to the pump unit 63 is formed in the base frame 3 to filter the working or dielectric fluid which is supplied to the work tank 9. A filter 67 which can be freely attached or removed for replacement is incorporated into this filter chamber 65. The filter 67 is connected to a distribution unit 69 to supply the working or dielectric fluid which has been filtered by this filter 67 to the work tank 9. The distribution unit 69 distributes the working or dielectric fluid between the work tank 9 and the electrode connection valve 71. The electrode connection valve 71 is used, for example, to connect to the electrode through, for example, a flexible hose when an electrode having either a dielectric fluid injection hole or dielectric fluid suction hole is used. In other words, it is used to carry out the electric discharge machining by injecting or sucking the dielectric into or from the electrode.

As can be understood from the configuration described above, the working or dielectric fluid in the storage tank 57 is fed to the filter chamber 65 by the pump in the pump unit 63, and is filtered by the filter 67 in the filter chamber 65. Then it is supplied to the work tank 9 through the distribution unit 69. When the work tank 9 is full, the overflow working or dielectric fluid flows from the opening 31 into the drain path 29 and is recirculated through the drain pipe 29P and the connecting chamber 59 to the storage tank 57.

A liquid level setting means 73 is installed inside the base frame 3 to set the level of the working or dielectric fluid in place in the work tank 9 to correspond to the size of the work piece W. In more detail the liquid level setting means 73 is in this embodiment a cylindrical-shaped member which has a bottom; a flexible hose is connected from an appropriate position on this liquid level setting means 73 to the inside of the work tank 9. Consequently, the working or dielectric fluid inside the work tank 9 flows through the hose 75 into the liquid level setting means 73.

Figure 3:
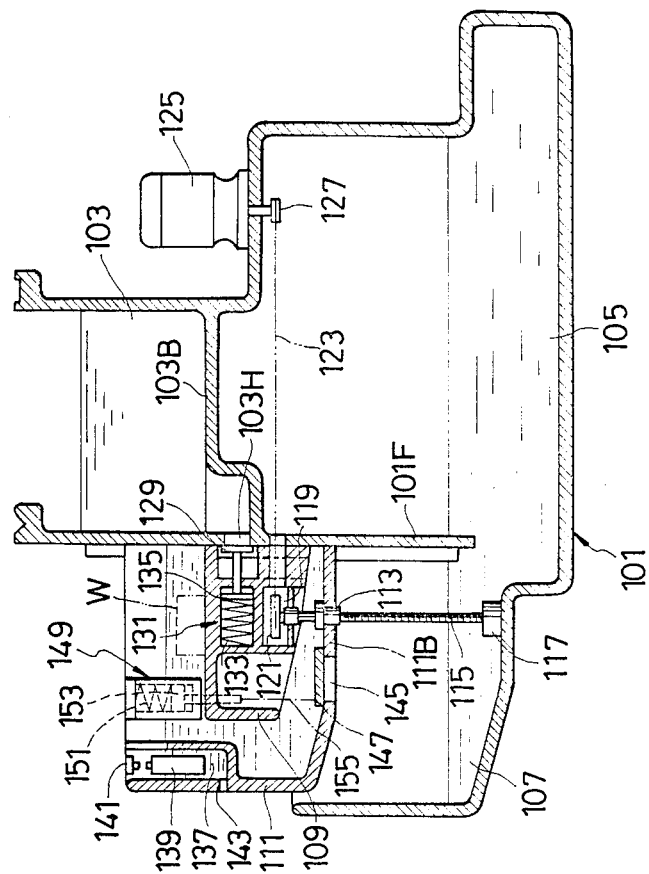
FIG. 3 is an expanded cross-sectional view taken along line III—III in FIG. 2.

Referring to FIGS. 2 and 3, the cylindrical liquid level setting means 73 is held in a vertical orientation; an overflow opening 77 is formed in the top of this liquid level setting means 73. Also, a liquid level detection switch 79 such as a float switch which detects whether or not the working or dielectric fluid has reached the level of the overflow opening 77 is installed in the gap of the liquid level setting means 73. This liquid base detection switch 79 acts to supply working or dielectric fluid when a drop in liquid level is detected or to stop the electrical discharge machining machine 1 when necessary to prevent fire. In addition, there is also a temperature sensor 81 to measure the temperature of the working or dielectric fluid at the top of the liquid level setting means 73.

An external control device 83 is installed on the base frame 3 to adjust the vertical position of the liquid level setting means 73 to correspond to the size of the work piece W. As is shown in detail in FIG. 3, the external control device 83 is a disc-shaped handle 85 in this embodiment. In more detail, the rotating shaft 91 is rotatably supported by the collar bushing 89, which is fixed to the base frame 3 by a plurality of bolts 87. The base of the link 93 is solidly fixed to the inside of this rotating shaft 91. A horizontal pin 95, which is fixed near the top of the liquid level setting means 73, is axially supported to the tip of the link 93. Consequently, the liquid level setting means 73 hangs vertically by its own weight. It is also possible to install a second link parallel to the link 93 so that there will be a parallel link mechanism for holding the liquid level setting means 73 vertically.

The manually operated handle 85 is solidly attached to the outside of the rotating shaft 91, for example by keys and bolts. A knob 97 is screwed into this manually operated handle 85 in such a manner that the tip of the threaded section 97S can contact the collar bushing 89.

In the configuration described above, the liquid level setting means 73 is moved up and down through the link 93 by turning the knob 97 an appropriate amount to loosen the contact between the tip of the threaded section 97S and the collar bushing 89, then turning the manually operated handle an appropriate amount. Thus, the height of the outflow opening 77 of the liquid level setting means 73 is adjusted. The working or dielectric fluid inside the work tank 9 flows down from the outflow opening 77 to the storage tank 57 through the hose 75. That is to say the level of the working or dielectric fluid inside the work tank 9 can be adjusted by moving the liquid level setting means 73 vertically by an appropriate amount.

When the liquid level setting means 73 is positioned at its highest position, the height of the outflow opening 77 in the liquid level setting means 73 is nearly equal to the height of the opening 31 in the work tank 9 which has been set as the upper limit. Consequently, the level of the working or dielectric fluid inside the work tank 9 is always set lower than the opening 31, to correspond to the size of the work piece W.

After the vertical position of the liquid level setting means 73 has been adjusted to set the level of the working or dielectric fluid inside the work tank 9 as discussed above, the manually operated handle 85 is fixed by re-tightening the knob 97 so that it cannot move, so that the liquid level setting means 73 is held at the position at which it has been set.

There is a scale to indicate the liquid level around the circumference of the manually operated handle 85 so that the liquid level can be set accurately. In addition, the indicator 99 corresponding to the scale is marked on part of either the base frame 3 or the manually operated handle 85.

As can be understood from the above explanation of this embodiment, in this invention the liquid level setting means is raised and lowered, adjusting the liquid level inside the work tank, by turning a manually operated handle in the external control device. Consequently, the liquid level can be adjusted easily to correspond to the size of the work piece without the operator coming into contact with the working or dielectric fluid. In addition, since it is not necessary to install a mechanism to adjust the liquid level inside the work tank, the configuration of the work tank is relatively simple, which has the advantage of making the work tank easier to manufacture.

Figure 4:
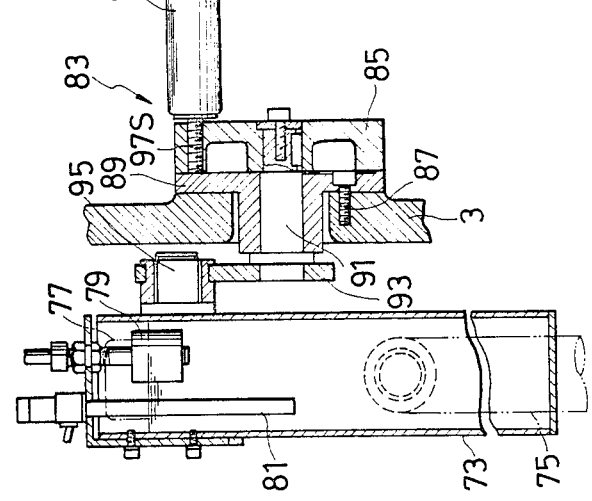
FIG. 4 is a cross-sectional diagram which functionally explains an alternate embodiment having a different arrangement of frame and other associated parts.

Another embodiment, having a different configuration of base frame, work table, work tank and other part, is shown functionally in FIG. 4. In more detail, in this embodiment the base frame 101 has a shape in which generally the control section protrudes upward. An upper tank 103 in which working or dielectric fluid is stored temporarily is formed on top of the base frame 101. The capacity of this upper tank 103 is smaller than the capacity of the storage tank 105 which is formed in the lower section. At a lower position than the upper tank 103, and in front of the storage tank 105, a container section 107 is formed which connects to the storage tank 105 and has an opening which faces upward.

The work table 109 which holds the work piece W in place is attached to the front wall 101F of the base frame 101 at a height approximately equal to the bottom 103B of the upper tank 103. A work tank 111 is capable of containing the work table 109, which is supported by the front wall 101F so that it is free to move up and down.

In order to raise and lower the work tank 111, in this embodiment a nut member 113 is fixed to the bottom 111B of the work tank 111; a threaded bolt or lever 115 which is screw-coupled to this nut member 113 is installed vertically so that it is free to rotate. The lower tip of this threaded bolt or lever 115 is supported by the bearing block 117, which is installed in the bottom of the container section 107, so that it is free to rotate. In addition, the upper tip of the threaded bolt 115 is coupled to a pulley 121, which is installed inside a chamber 119 formed in the work table 105, in some appropriate manner. A belt 123 is wrapped around both this pulley and the drive pulley 127 which is attached to the motor 125 installed in the base frame 101.

In the configuration described above, the work tank is moved up or down by the desired amount by driving the motor 125 by an appropriate amount to rotate the threaded bolt or lever 115 in the forward or reverse direction.

In order to supply working or dielectric fluid to the work tank 111, a relatively large connecting hole 103H which communicates with the work tank 111 is formed near the bottom 103B of the upper tank 103. This connecting hole 103H is opened and closed by the opening and closing valve 129. The opening and closing valve 129 is opened and closed by the action of the hydraulic cylinder 131 on the work table 109. That is to say, inside the hydraulic cylinder 131 are a return spring 133 and a slidable piston 135. The piston 135 is coupled to the opening and closing valve 129 through a piston rod.

In the configuration described above, the opening and closing valve 129 normally closes the connecting hole 103H by the action of the return spring 133. When working fluid is supplied to the hydraulic cylinder 131 causing the piston 135 to move in opposition to the return spring 133, the closing of the connecting hole 103H by the opening and closing valve 129 is released. Consequently, working or dielectric fluid inside the upper tank 103 flows into the work tank 111.

When working or dielectric fluid flows into the work tank 111 as discussed above, by prepositioning the work tank 111 at its lowered position, the water head from the upper tank 103 to the work tank 111 can be used to aid this flow. Consequently, in this case, fluid can be supplied to the work tank 111 rapidly.

A float chamber 137 is formed at an appropriate position in the work tank 111 to detect when the work tank 111 has filled with working or dielectric fluid. A float 139 is incorporated in this float chamber 137 so that it is free to move up and down. In addition, a limit switch 141 is positioned at the top of the float chamber 137 so that it is operated by the float 139. This limit switch 141 stops the action of the hydraulic cylinder 131 when it is operated by the float 139, so that the opening and closing valve 129 will close the connecting hole 103H in the upper tank 103.

The top of the float chamber 137 is connected to the interior of the work tank 111. When the work tank 111 is full of working or dielectric fluid, working or dielectric fluid flows into the float chamber 137. In addition, there is a small-diameter outflow hole 143 in the bottom of the float chamber 137.

In the configuration described above, as discussed previously, when working or dielectric fluid flows from the upper tank 103 into the work tank 111 and the work tank 111 fills up, part of the working or dielectric fluid overflows into the float chamber 137. When the float 139 inside the float chamber 137 floats up and operates the limit switch 141, the supply of working fluid to the fluid pressure cylinder 131 is cut off, and the action of the hydraulic cylinder 131 stops. Therefore, the opening and closing valve 129 closes the connecting hole 103H by the action of the return spring 133 inside the hydraulic cylinder 131, and the supply of working or dielectric fluid from the upper tank 103 stops. Consequently, even if the amount of working or dielectric fluid that can flow into the work tank 111 changes according to the size of the work piece W, working or dielectric fluid will not overflow from the work tank 111.

A relatively large discharge port 145 is formed in the bottom 111B of the work tank 111 so that the dielectric fluid inside the work tank 111 can be discharged quickly when it becomes necessary to change the dielectric fluid. Installed at the position of this discharge point 145 is an opening and closing valve 147 which is free to open and close through, for example, a hinge pin. This opening and closing valve 137 is opened and closed by the action of a hydraulic cylinder 149 in the work tank 111. That is to say, inside the hydraulic cylinder 149 are a return spring 151 and a piston 153 which is free to slide; the piston 153 is coupled to the opening and closing valve 147 through a piston rod and the chain 155.

In the configuration described above, normally the opening and closing valve 147 closes the discharge port 145. When working fluid is supplied to the hydraulic cylinder 149, causing the piston 153 to move in opposition to the return spring 151, the opening and closing valve 147 is pulled by the chain 155 etc. to open the discharge port 145. Consequently, the working or dielectric fluid inside the work tank 111 is discharged rapidly from the discharge port 145.

That is to say, in this embodiment, working or dielectric fluid can be supplied to and discharged from the work tank 111 rapidly, so that, for example, the working or dielectric fluid can be replaced efficiently. In addition, since working or dielectric fluid can be prestored inside the upper tank 103, the working or dielectric fluid can be supplied to the work tank rapidly and without difficulty even with a small pump.

It is to be understood that although the invention has been described with specific reference to particular embodiments thereof it is not to be so limited, since changes and alterations therein may be made which are within the full intent and scope of this invention as defined by the appended claims.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A liquid level setting means for an electric discharge machine, which comprises:
   (a) a frame;
   (b) a work tank supported in said frame, for accommodating a working fluid;
   (c) a vertically installed cylindrical member communicating with the work tank and installed inside said frame so as to be freely movable vertically, said cylindrical member being formed with an overflowing opening;
   (d) a manually operated handle installed outside the frame for controlling the vertical position of said vertically installed cylindrical member; and
   (e) a link mechanism coupling said vertically installed cylindrical member and said manually operated handle such that when said handle is rotated, said cylindrical member is adjustably moveable up and down to adjust the level of the working fluid in said work tank.

2. The liquid level setting means as set forth in claim 1, which further comprises a liquid level detection switch installed at the top of said cylindrical member, for detecting whether or not working fluid has reached a level of the overflow opening of said cylindrical member to furhter supply working fluid into said work tank.

3. The liquid level setting means as set forth in claim 1, wherein said manually operated handle is fixed after working the fluid level adjustment.

* * * * *